(12) United States Patent
Wadsworth

(10) Patent No.: US 11,077,624 B2
(45) Date of Patent: *Aug. 3, 2021

(54) SYSTEM AND METHOD FOR WELDING THERMOPLASTIC COMPONENTS TO CREATE COMPOSITE STRUCTURE

(71) Applicant: Spirit AeroSystems, Inc., Wichita, KS (US)

(72) Inventor: Mark Anthony Wadsworth, Sedan, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/874,069

(22) Filed: May 14, 2020

(65) Prior Publication Data
US 2020/0269519 A1 Aug. 27, 2020

Related U.S. Application Data

(63) Continuation of application No. 16/013,420, filed on Jun. 20, 2018, now Pat. No. 10,703,049.

(51) Int. Cl.
| | | |
|---|---|---|
| *B32B 37/00* | (2006.01) | |
| *B29C 65/20* | (2006.01) | |
| *B29C 65/30* | (2006.01) | |
| *B29C 65/00* | (2006.01) | |

(52) U.S. Cl.
CPC .......... *B29C 65/2053* (2013.01); *B29C 65/30* (2013.01); *B29C 66/43* (2013.01); *B29C 66/721* (2013.01); *B29C 66/91231* (2013.01)

(58) Field of Classification Search
USPC .............................................. 156/580, 583.1
See application file for complete search history.

(56) References Cited

U.S. PATENT DOCUMENTS

| 4,175,998 A | 11/1979 | Boruszewski et al. |
| 10,703,049 B2 * | 7/2020 | Wadsworth ......... B29C 66/8181 |

FOREIGN PATENT DOCUMENTS

| FR | 2488828 | 2/1982 |

\* cited by examiner

*Primary Examiner* — James D Sells
(74) *Attorney, Agent, or Firm* — Hovey Williams LLP

(57) ABSTRACT

A system and method for welding thermoplastic components by positioning and moving a heated plate between the components to melt their respective faying surfaces, and as the plate moves, pressing the components together so that the melted faying surfaces bond together as they cool and re-solidify, thereby creating a composite structure. The plate has a heated portion which is positioned between and heated to melt a portion of the first and second faying surfaces. A manipulator mechanism moves the plate along an interface from between the portion to between a series of subsequent portions of the first and second faying surfaces, thereby welding the thermoplastic components along the entire interface to create the composite structure. The heated portion may contact the faying surfaces and melt them through conduction, or may be suspended between them and melt them through radiation and convection.

20 Claims, 12 Drawing Sheets

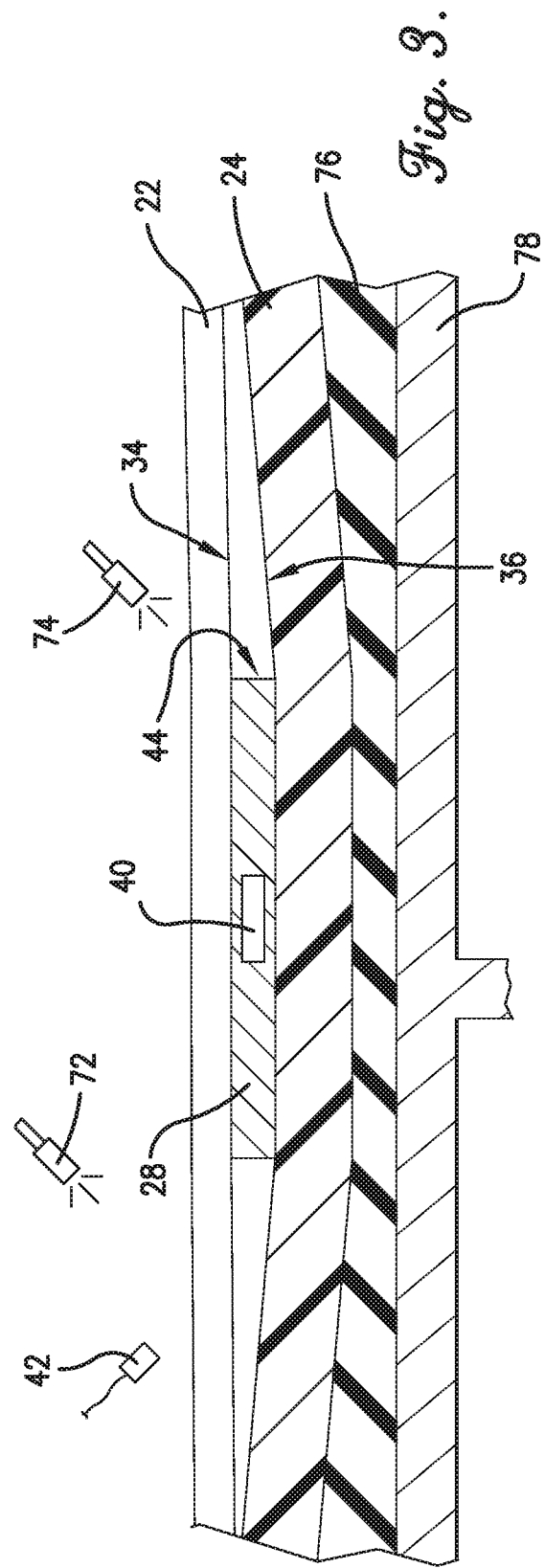
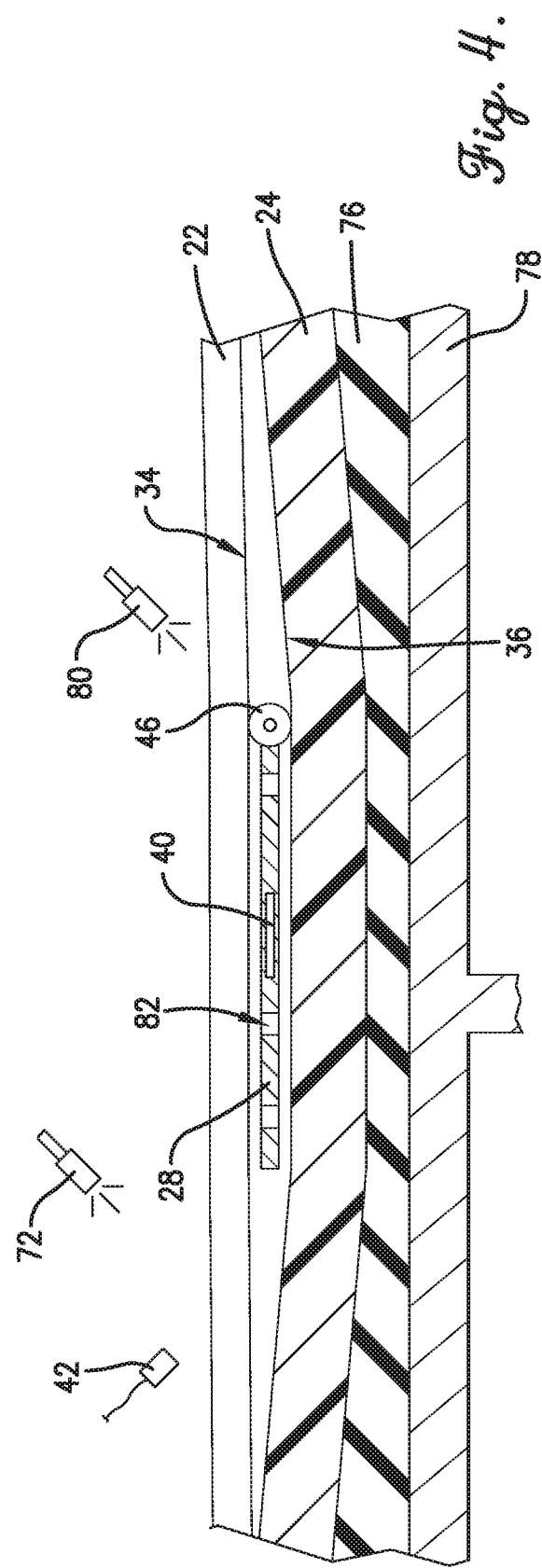

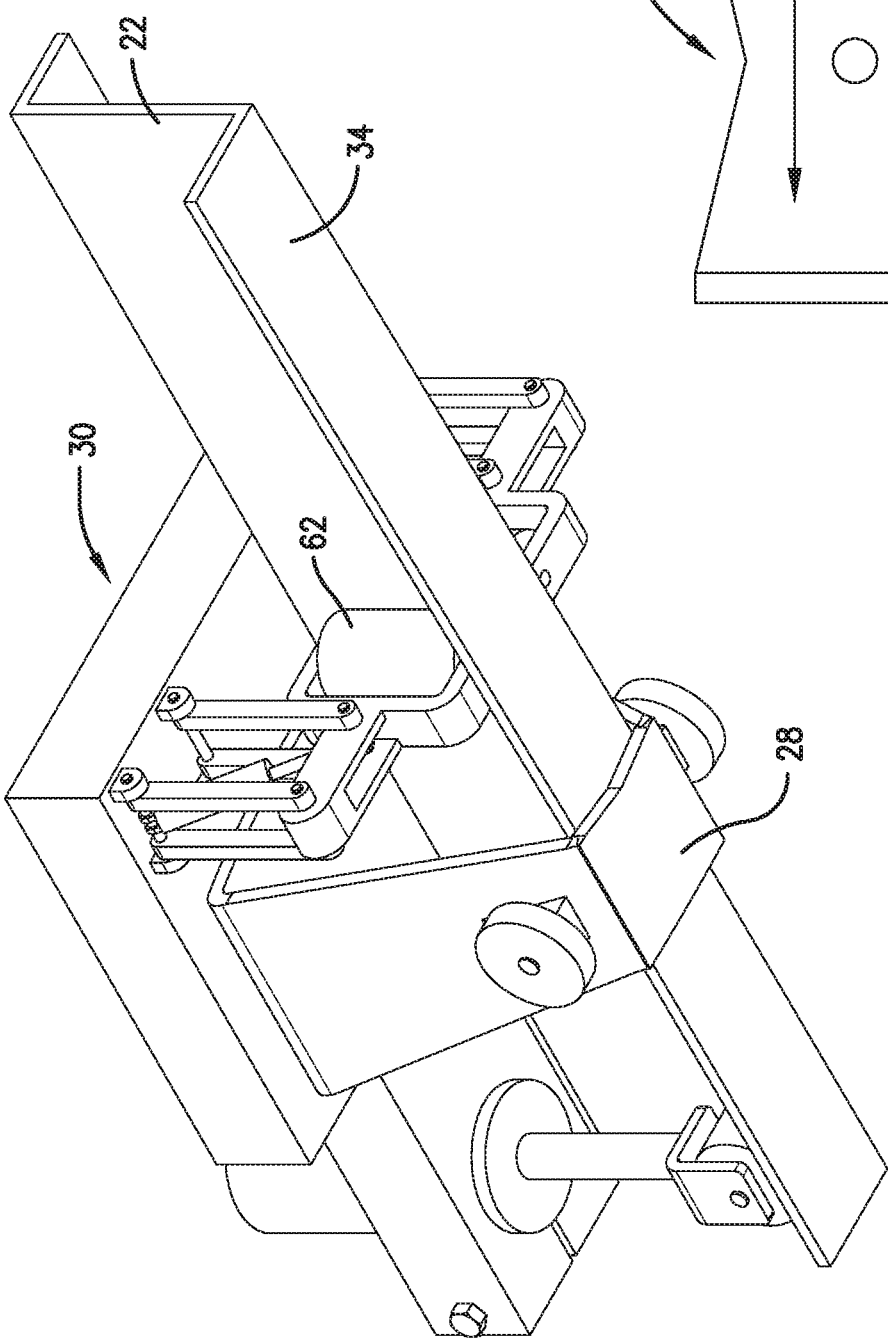
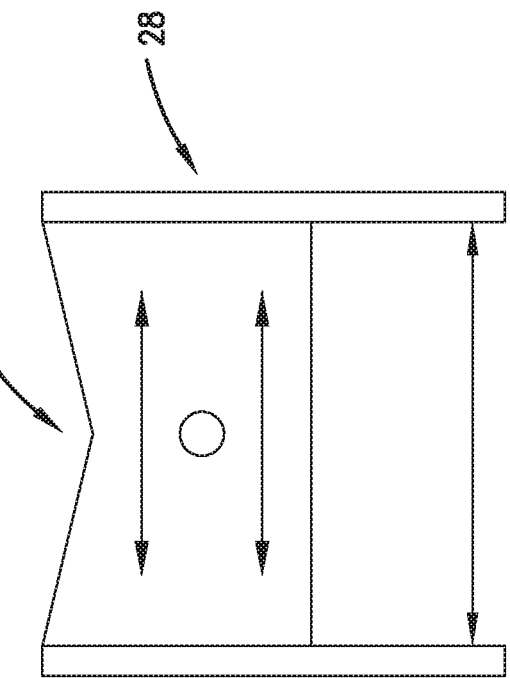

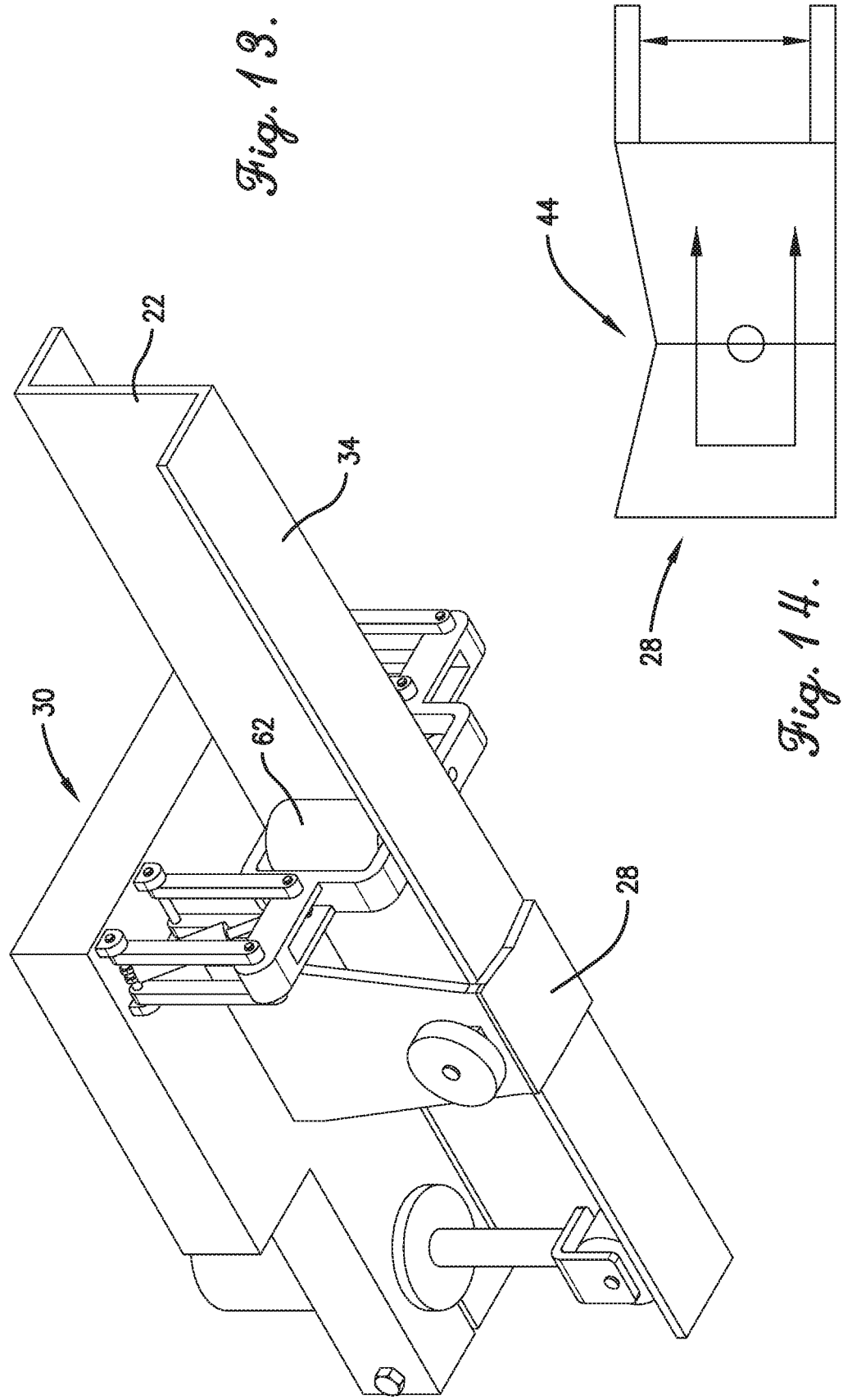

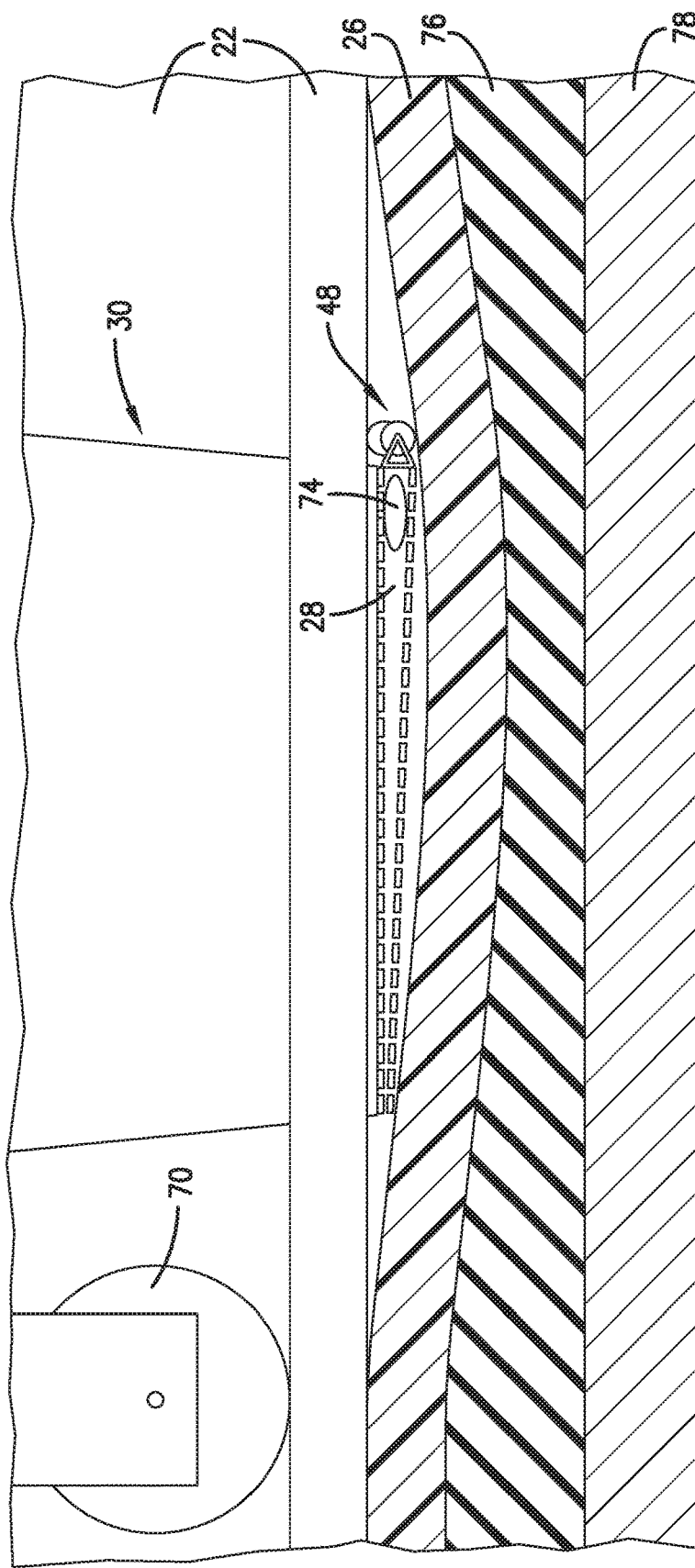
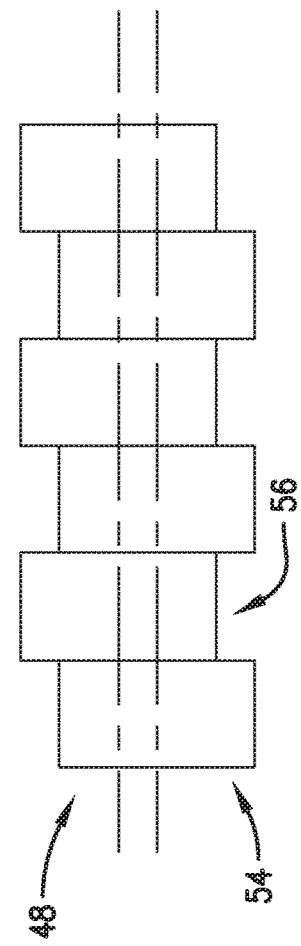

SYSTEM AND METHOD FOR WELDING THERMOPLASTIC COMPONENTS TO CREATE COMPOSITE STRUCTURE

RELATED APPLICATIONS

The present U.S. non-provisional patent application is a continuation and claims priority benefit of an earlier-filed U.S. non-provisional patent application with the same title, Ser. No. 16/013,420, filed Jun. 20, 2018. The entire content of the identified earlier-filed application is incorporated by reference as if fully set forth herein.

FIELD

The present invention relates to systems and methods for creating composite structures, and more particularly, embodiments concern a system and method for welding thermoplastic components by positioning and moving a heated plate element between the components to melt the respective faying surfaces, and as the plate element moves, pressing the components together so that the melted faying surfaces bond together as they cool and re-solidify, thereby creating a composite structure.

BACKGROUND

Thermoplastics are polymers, typically synthetic resins, that melt when heated and solidify when cooled. Thermoplastic laminate components can be welded by heating and then cooling faying surfaces between the components to bond them together to form composite structures. The most common techniques for thermoplastic composite welding are induction welding, ultrasonic welding, and resistance welding, but each of these techniques suffers from particular disadvantages.

Induction welding using a susceptor involves incorporating a foreign material into the weld line, which has undesirable effects on structural integrity and reliability. Induction welding without using a susceptor can be difficult to control and requires substantial engineering and design to determine the correct coil and heat sink configuration to avoid temperature control problems and resin degradation or poor welds. Further, nearby metal, such as a lightning strike protection conductor, can act as a susceptor and cause additional heat distribution issues. Ultrasonic welding requires an energy director in the weld line, results in lower strength welds, can distort fiber alignment, and is difficult to use for continuous welds. Resistance welding using a carbon fiber resistive element in the weld line creates continuous welds with good strength. However, resistance welding is difficult to use in production processes because the entire resistance circuit is heated simultaneously and therefore must be clamped and supported throughout the entire welding process. Further, provisions for making reliable electrical bonds to the fibers are not conducive to automation, and individual locations are not temperature controlled, and instead, the entire circuit is on a single channel. Further, it is generally important to avoid degrading/deconsolidating the laminate components due to overheating, so techniques that generate too much heat beyond the faying surfaces may require heat mitigation (e.g., heat sink technology).

Traditional hot plate welding is another common technique in which an entire weld area is heated at the same time with a contoured plate and then the melted surfaces are brought together. However, this can result in difficulty initially aligning and thereafter maintaining the positions of the thermoplastic components due to the instability of the melted faying surfaces. It is also known to weld the seams of products made of thermoplastic fabrics, such as tents, tarps, and parachutes. However, the nature of the materials makes this welding process substantially different than materials welded using the techniques described above. In particular, the fabrics are much more flexible and are initially separated and brought together at the time of welding, while the materials at issue are relatively stiff (one may even be a stiffener structure) and are already aligned and maintained in particular positions at the time of welding.

This background discussion is intended to provide information related to the present invention which is not necessarily prior art.

SUMMARY

Embodiments address the above-described and other problems and limitations by providing a system and method for welding thermoplastic components by positioning and moving a heated plate element between the components to melt the respective faying surfaces, and as the plate element moves, pressing the components together so that the melted faying surfaces bond together as they cool and re-solidify, thereby creating a composite structure.

In one embodiment, a system is provided for welding a first thermoplastic component to a second thermoplastic component along an interface to create a composite structure. Broadly, the system may include a plate element and a manipulator mechanism. The plate element may have a heated portion which may be positioned between a portion of a first faying surface of the first thermoplastic component and a second faying surface of the second thermoplastic component. The heated portion may be heated to an operating temperature which is sufficient to melt the portion of the first and second faying surfaces. The manipulator mechanism may move the plate element along the interface from between the portion of the first and second faying surfaces, which then cool and bond together, to between a series of subsequent portions of the first and second faying surfaces, and thereby weld the first thermoplastic component to the second thermoplastic component along the interface to create the composite structure.

Various implementations of this embodiment may include any one or more of the following features. The heated portion the plate element may have a thickness of approximately between 0.01 inches and 0.03 inches. The heated portion of the plate element may be heated using joule heating. The system may further include a first temperature sensor which may determine the operating temperature of the plate element, and a second temperature sensor which may determine an adjacent temperature of the first and second thermoplastic components.

In a first or "contact" implementation, at least the heated portion of the plate element may be in physical contact with the portion of the first and second faying surfaces, and may melt the portion of the first and second faying surfaces through conduction. A front portion of the plate element may have a rake angle to control any excess melted thermoplastic material from the first and second faying surfaces. The rake angle may be approximately between 10 degrees and 50 degrees.

In a second or "gap" implementation, at least the heated portion of the plate element may be suspended between and not in physical contact with the portion of the first and second faying surfaces, and may melt the portion of the first and second faying surfaces through radiation and convection. The system may further include a spacer element which may create a gap between the first and second faying surfaces, wherein at least the heated portion of the plate element is located in the gap. The spacer element may be an unheated front portion of the plate element, and/or the spacer element may include one or more circular rollers. The system may further include an air nozzle configured to introduce a stream of air or inert gas between at least the heated portion of the plate element and the first and second faying surfaces so as to enhance convection and reduce oxidation. The system may further include one or more holes in the plate element to enhance convection.

The manipulator mechanism may further include a guide roller configured to guide movement of the plate element along the interface between the first and second faying surfaces. The manipulator mechanism may further include a pressure roller configured to press the first and second faying surfaces together behind the plate element as the plate element is moved along the interface. The manipulator mechanism may further include a cooling nozzle configured to deliver a cooling fluid to accelerate cooling of the first and second faying surfaces behind the plate element as the plate element is moved along the interface. The manipulator mechanism may further include an inert gas nozzle configured to deliver an inert gas to displace oxygen around the heated portion of the plate element. The system may further include a support surface configured to be positioned behind the second thermoplastic component, wherein the support surface is flexible so as to accommodate a deflection of the second thermoplastic component as the plate element is moved between the first and second faying surfaces.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 3 is a fragmentary cross-sectional side elevation view of a first or "contact" implementation of the system of FIG. 1;

FIG. 4 is a fragmentary cross-sectional side elevation view of a second or "gap" implementation of the system of FIG. 1;

FIG. 9 is an isometric fragmentary view of the system of FIG. 5 showing the plate element component in operation;

FIG. 10 is a plan view of the plate element component of FIG. 5 showing a rake angle;

FIG. 13 is an isometric fragmentary view of the system of FIG. 11 showing the plate element component in operation;

FIG. 14 is a plan view of the plate element component of FIG. 11 showing a rake angle;

FIG. 15 is a fragmentary cross-sectional side elevation view of the system of FIG. 5;

FIG. 16 is a fragmentary front elevation view of a roller element component of the system of FIG. 15.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, embodiments provide a system and method for welding thermoplastic components by positioning and moving a heated plate element between the components to melt the respective faying surfaces, and as the plate element moves, pressing the components together so that the melted faying surfaces bond together as they cool and re-solidify, thereby creating a composite structure. In contrast to traditional hot plate welding which heats the entire weld area at the same time, embodiments utilize the motion of the plate element and the stiffness of the components and/or an underlying support surface to provide a clamping force against the plate element to join the melted surfaces. Further, unlike in traditional hot plate welding, there may be little or no movement of the components themselves because the faying surfaces are kept together and are only separated by the thin plate element moving between them during the welding process. Although described herein in the example context of manufacturing aircraft, the present technology may be adapted for use in substantially any suitable application (in, e.g., the automotive and/or shipbuilding industries) involving welding thermoplastic components.

Figure 1:
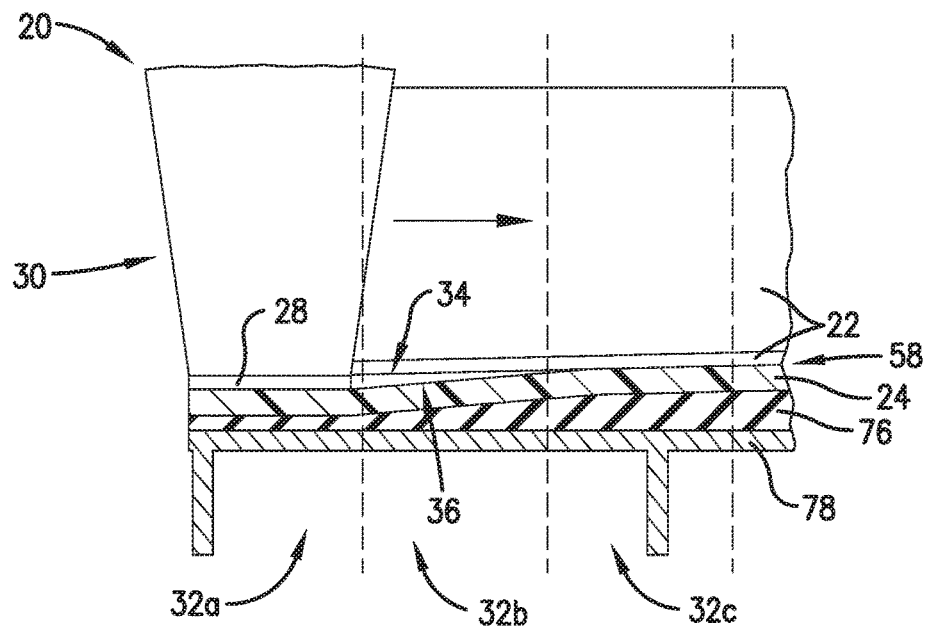
FIG. 1 is a fragmentary cross-sectional side elevation view of an embodiment of a system for welding first and second thermoplastic component to create a composite structure, wherein the system is shown in a starting position.
Figure 2:
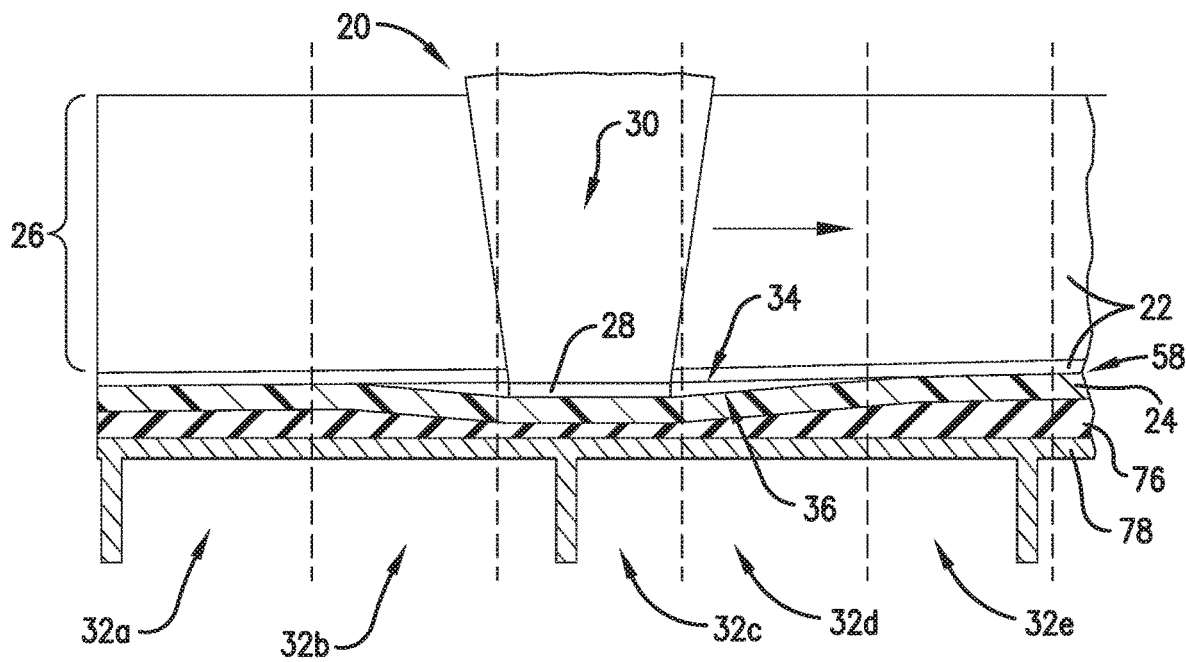
FIG. 2 is a fragmentary cross-sectional side elevation view of the system of FIG. 1, wherein the system is shown moving along an interface between the first and second thermoplastic components.
Figure 5:
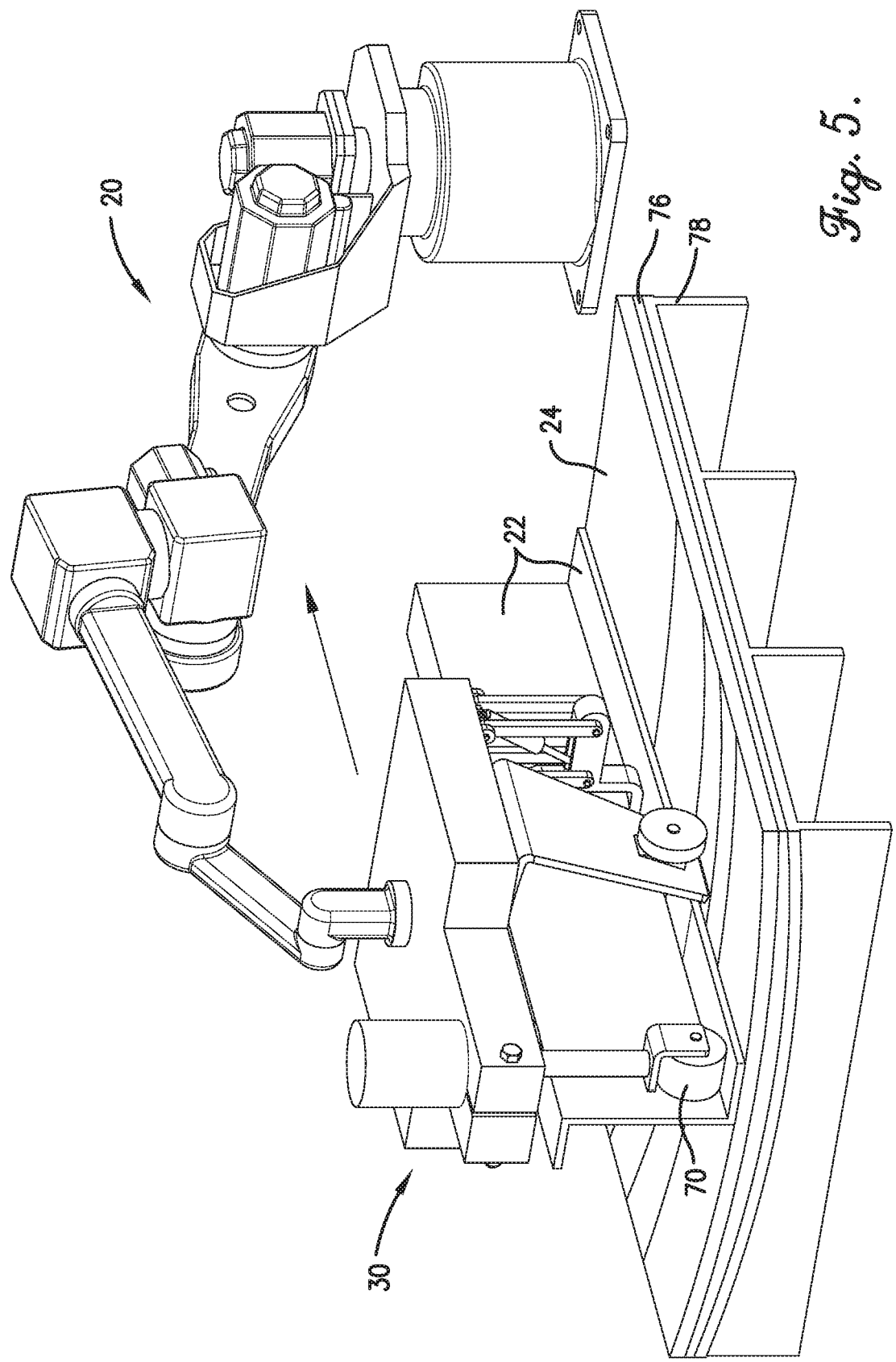
FIG. 5 is an isometric view of an implementation of the system of FIG. 1, wherein a plate element component of the system is supported on both sides.
Figure 6:
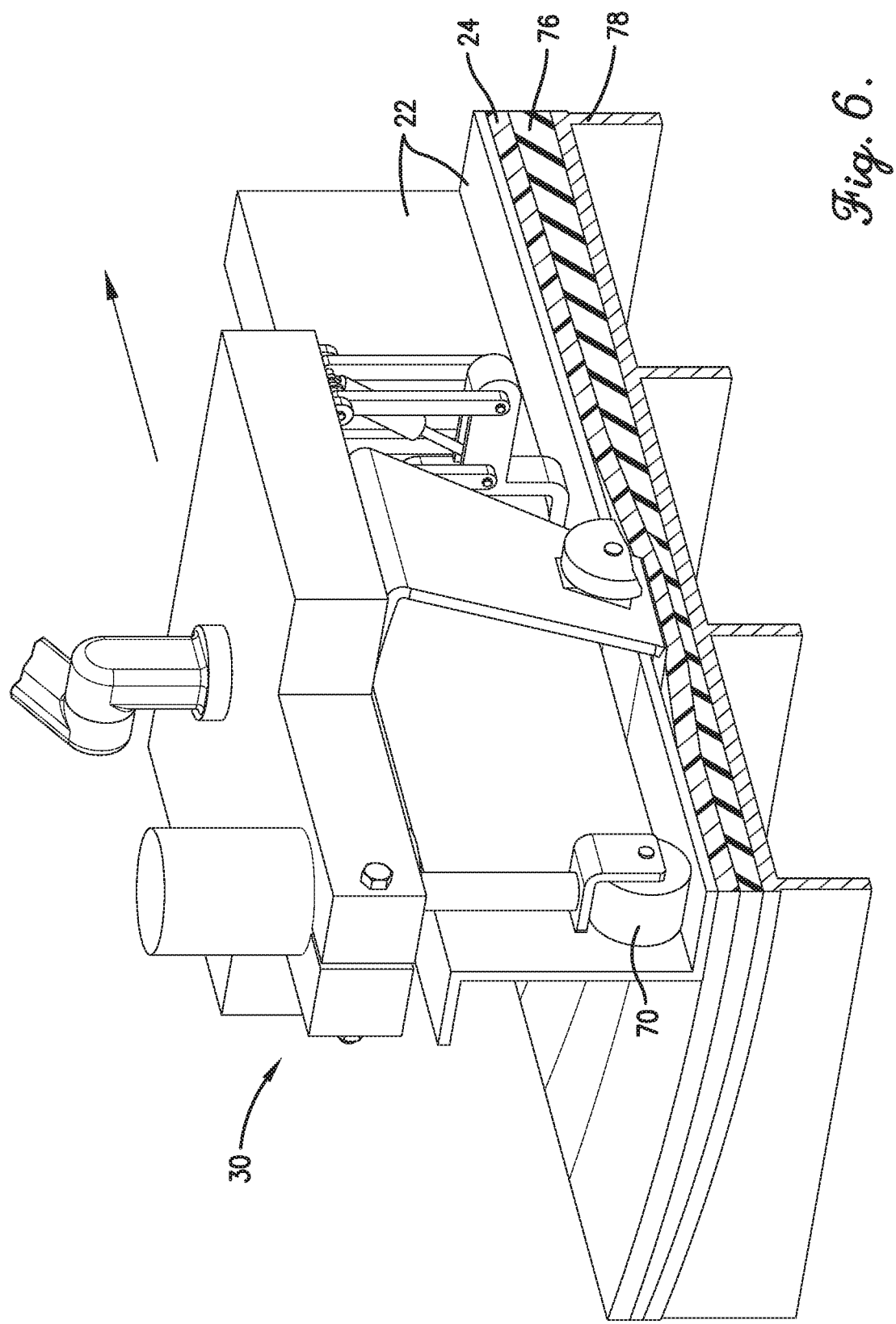
FIG. 6 is a fragmentary cross-sectional isometric view of the system of FIG. 5.
Figure 7:
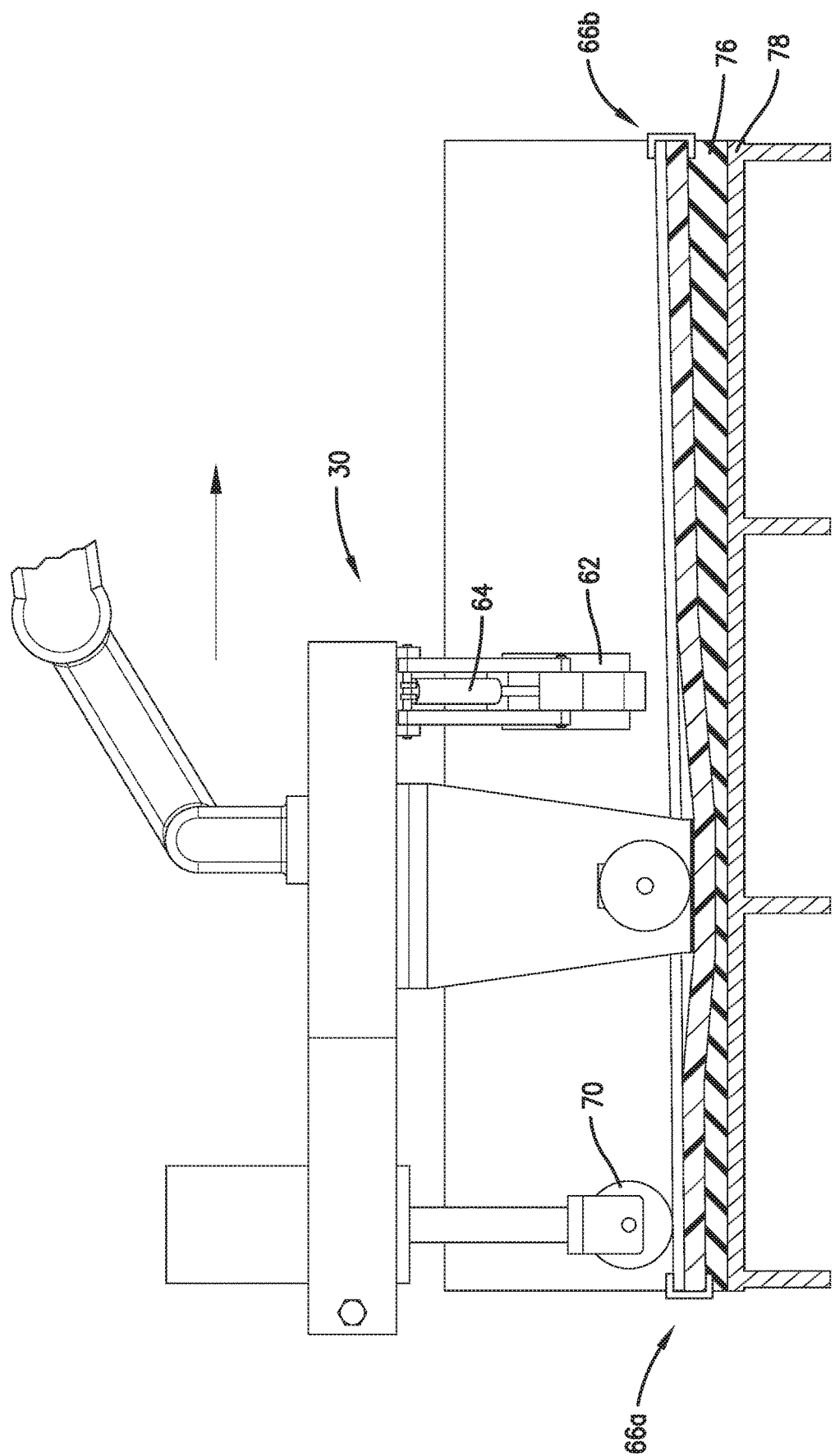
FIG. 7 is a fragmentary cross-sectional side elevation view of the system of FIG. 5.
Figure 8:
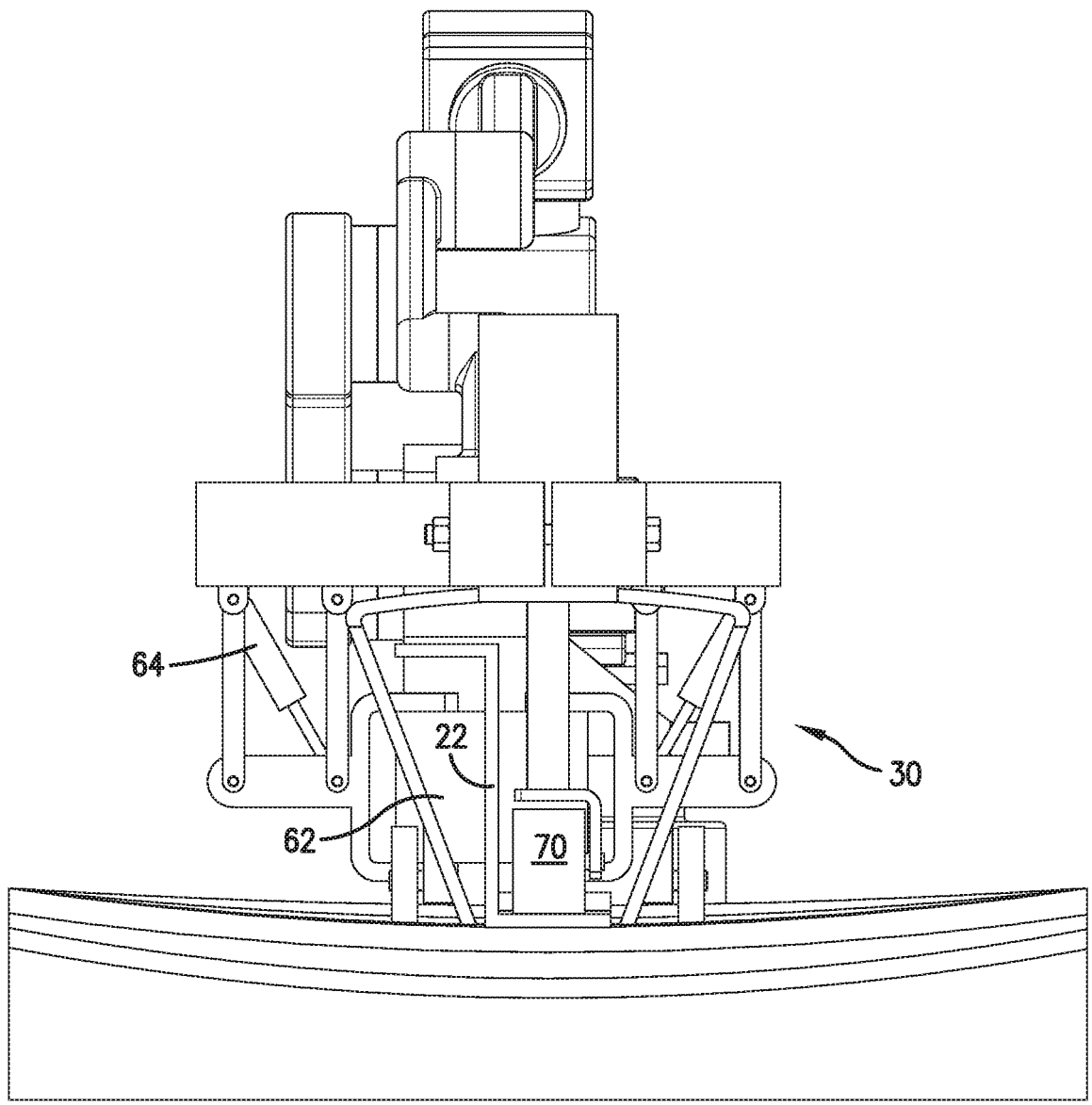
FIG. 8 is a fragmentary cross-sectional front elevation view of the system of FIG. 5.
Figure 11:
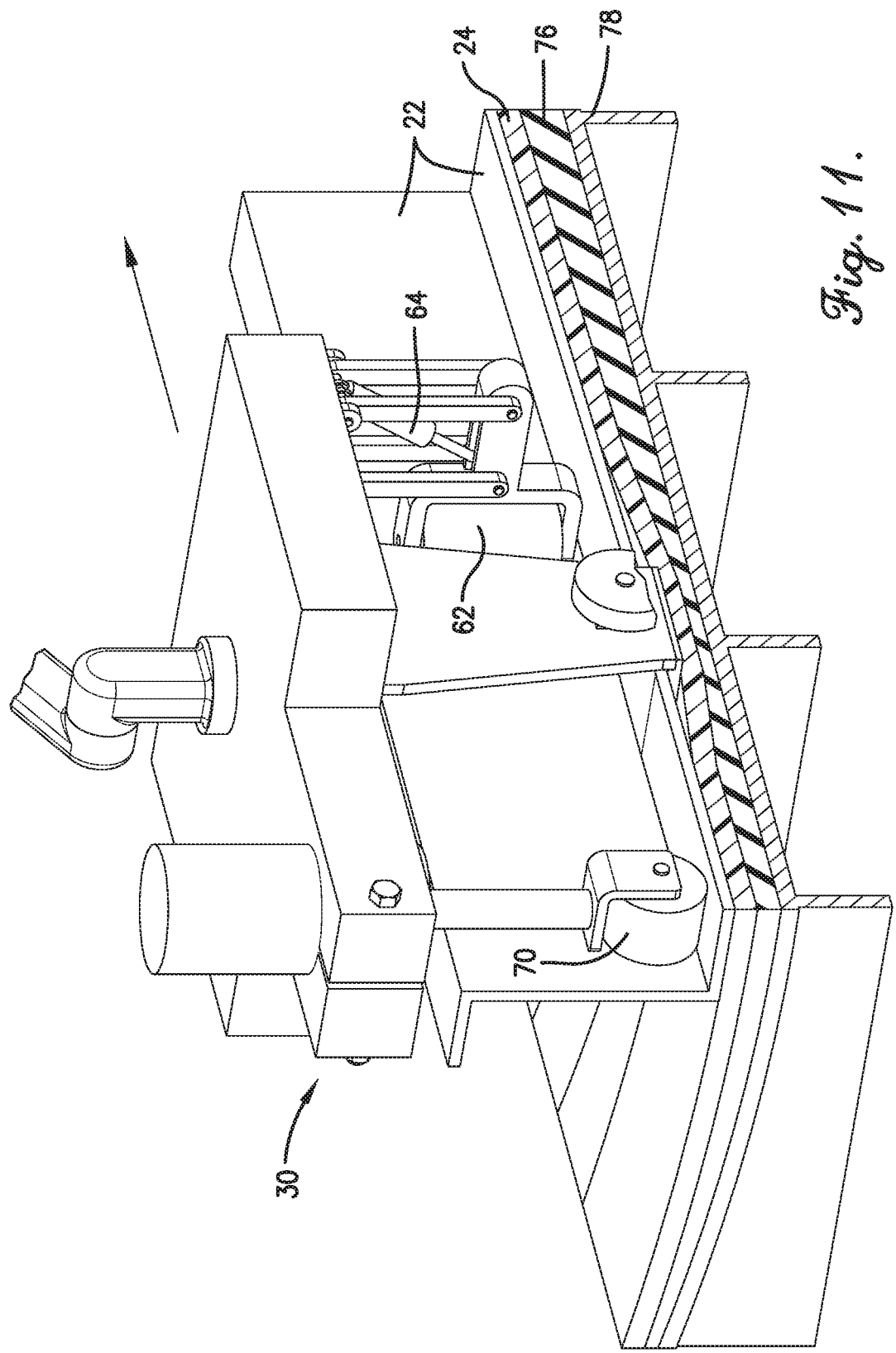
FIG. 11 is a fragmentary isometric view of an implementation of the system of FIG. 1, wherein a plate element component of the system is supported on one side (i.e., cantilevered)
Figure 12:
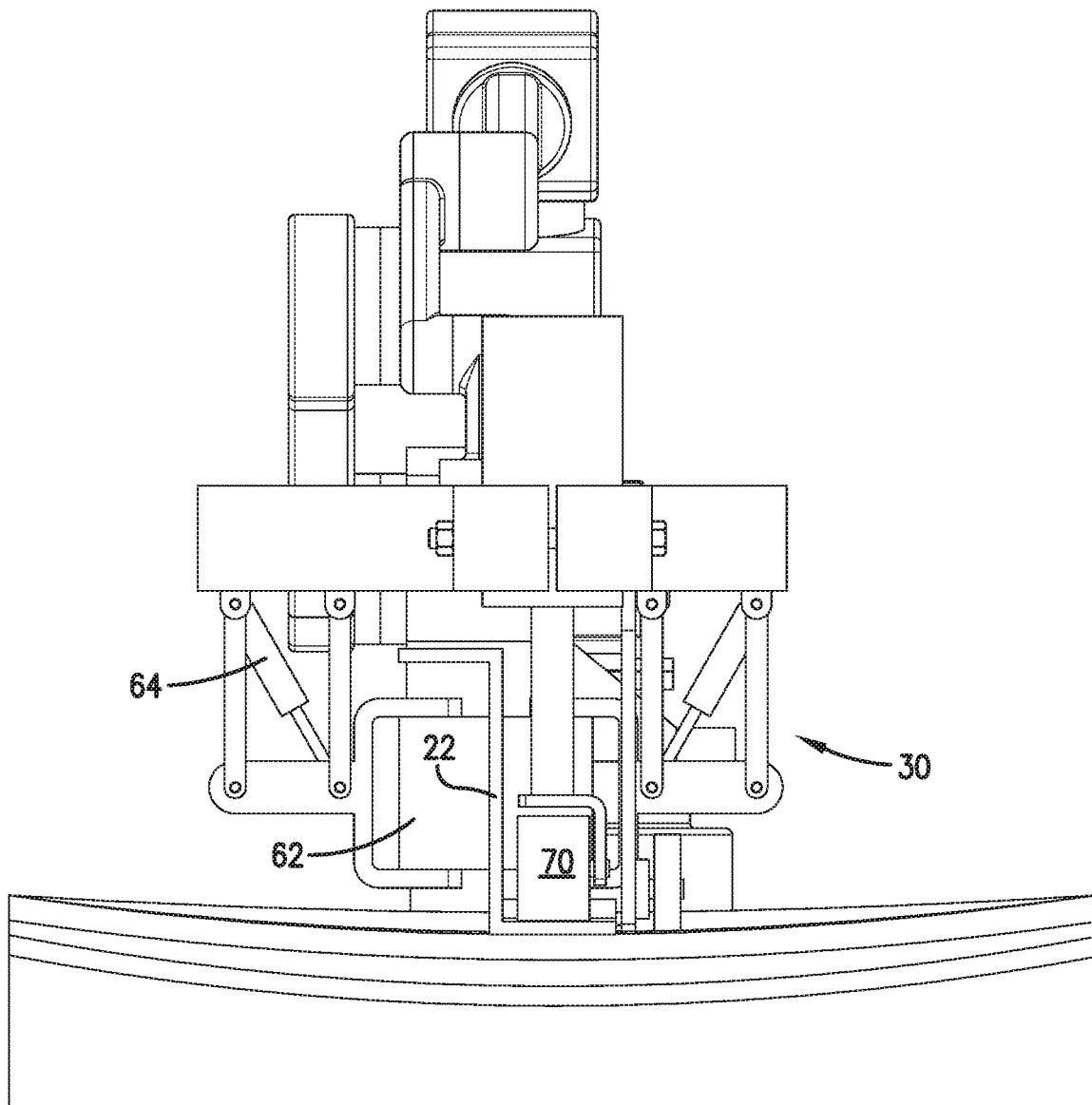
FIG. 12 is a fragmentary cross-sectional front elevation view of the system of FIG. 11.

Referring initially to FIGS. 1 and 2, an embodiment of a system 20 is shown for welding a first thermoplastic component 22 to a second thermoplastic component 24 to construct a composite structure 26. In one example application, the first component 22 may be an aircraft stringer or other relatively rigid component, and the second component may be an aircraft skin or other relatively flexible component. The system 20 may include a plate element 28 and a manipulator mechanism 30. The plate element 28 may be configured to be positioned between an initial or current portion 32*a* of a first faying surface 34 of the first thermoplastic component 22 and a second faying surface 36 of the second thermoplastic component 24, and to be heated to an operating temperature which is sufficient to melt the portion 32*a* of the first faying and second faying surfaces 34,36.

The thickness of the plate element 28 may depend, at least in part, on the natures of the first and/or second components 22,24 and the particular application and requirements of the welding process. In general, it may be desirable for the plate element 28 to be relatively thin so as to minimize the deflection of the first and/or second components 22,24 as the plate element 28 moves between them. Relatedly, the maximum ability of the first and/or second component 22,24 to deflect may determine an upper limit on the thickness of the plate element 28. In various implementations, the plate element 28 may have a thickness of approximately between 0.005 inches and 0.05 inches, approximately between 0.01 inches and 0.03 inches, or approximately 0.02 inches. The thickness of the plate element 28 may also depend, at least in part, on the nature and design of the manipulator mechanism 30 which supports the plate element 28. For example, a cantilevered plate element may be relatively thicker to avoid buckling, while a plate element supported on both ends may be relatively thinner. The plate element 28 may be constructed of substantially any suitable material, such as nichrome, titanium, Inconel, stainless steel, or other high temperature, corrosion resistant metal. In one implementation, the plate element 28 may be constructed of a material having a relatively high electrical resistance to facilitate joule (or resistance) heating.

The plate element 28 may be heated by one or more heating circuits. More specifically, the plate 28 may be joule heated to an operating temperature by passing an electric current through the material of the plate. The operating temperature of the plate 28 may depend, at least in part, on the natures of the first and/or second components 22,24 and the particular application and requirements of the welding process. In general, the operating temperature may be sufficient to melt the first and second faying surfaces 34,36 and accomplish the desired weld. Thus, the minimum operating temperature may be the melting point of the first and second faying surfaces 34,36, and the maximum temperature may be determined by the ability to transfer enough heat sufficiently quickly so to avoid degradation/decomposition of the first and second components 22,24 due to the heat. In particular, it may be desirable to heat the first and second faying surfaces 34,36 while minimizing heating of the bodies of the first and second components 22,24.

The temperature of the plate element 28 may be measured by one or more first sensors 40 (shown in FIGS. 3 and 4) at one or more locations on the plate element 28. Multiple measurements at different points may be desirable if the plate element 28 loses more heat in one region than in another region due to, e.g., a heat sink effect. In one implementation, one or more thermocouples may be used to measure the temperature of the plate element 28. Relatedly, multiple independently controllable heating circuits may be used to heat the plate element 28 to better compensate for any such differences in temperature across the plate element 28, and to allow for greater flexibility in how the faying surfaces 34,36 are heated. The temperature of the first and second faying surfaces 34,36 may be at least as relevant as the temperature of the plate element, in which case the temperature of the first and second faying surfaces 34,36 may be measured by one or more second sensors 42 (shown in FIGS. 3 and 4) at one or more locations on the faying surfaces 34,36. In one implementation, one or more optical temperature sensors may be used to measure the temperature of the first and second faying surfaces 34,36.

In one implementation, additional resin may be introduced and melted between the faying surfaces 34,36 to facilitate bonding. This additional resin may be provided in the form of injected liquid resin, solid resin film, or an additional layer of prepreg (i.e., an extra layer of fiber and resin).

In a first or "contact" implementation, shown in FIG. 3, the plate element 28 may be generally in physical contact with the faying surfaces 34,36 while the plate element 28 moves between and heats the faying surfaces 34,36 through conduction. In the contact implementation, a front portion 44 of the plate element 28 may be provided with a rake angle to direct or otherwise control any excess thermoplastic resin material from the first and second faying surfaces 34,36. More specifically, the rake angle may sweep the excess resin to the centerline of the weld where it may be squeezed out of the way, which promotes the ejection of air from between the first and second components 22,24. In various implementations, the rake angle may be approximately between 10 degrees and 50 degrees, or approximately between 20 degrees and 40 degrees.

In a second or "gap" implementation, shown in FIGS. 4, 15, and 16, the plate element 28 may be generally suspended between and not in physical contact with the faying surfaces 34,36 as the plate element 28 moves between and heats the faying surfaces 34,36 through radiation and convection. In the gap embodiment, a spacer element 46 may be provided to create a gap in which at least the heated portion of the plate element 28 moves, and thereby prevents the faying surfaces 34,36 from physically contacting at least this heated portion of the plate element 28. In one implementation, the spacer element 44 may be provided by thickening or shaping an unheated front portion of the plate element 28 to separate the faying surfaces 34,36 around the heated portion of the plate element 28. In another implementation, the same spacing effect may be accomplished by physically forcing (e.g., pulling or pushing) the first and/or second faying surfaces 34,36 apart. In another implementation, a wedge or roller element 48 may be provided at the leading edge of the plate element 28 to create the gap. As shown in FIG. 16, the roller element 48 may include a plurality of rollers which may be offset from each other so that some of the rollers 54 roll across the first faying surface 34 and others of the rollers 56 roll across the second faying surface 36. Such as roller element advantageously avoids dragging across and potentially damaging or contaminating the faying surfaces 34,36. One advantage of the gap embodiment is that it avoids physical, high temperature contact which could otherwise damage or misalign the fibers of the first and second thermoplastic components. However, the gap embodiment may require a higher operating power than the contact embodiment due to convection heat losses. In various implementations, an air nozzle 80 may introduce air into the gaps between the plate element 28 and the faying surfaces 34,36 to enhance convection, and/or one or more holes 82 may be provided in the plate element 28 itself to enhance convection.

Referring also to FIGS. 5-15, the manipulator mechanism 30 may be configured to move the heated plate element 28 between the first and second faying surfaces 34,36, from one end of the interface 58 of the first and second components 22,24 to the other end, such that the plate element 28 heats and melts the portion 32a of the first and second faying surfaces 34,36, and such that as the plate element 28 is moved along the interface 58, the heated and melted portions of the first and second faying surfaces 34,36 bond together as they cool and re-solidify behind the plate element 28. The manipulator mechanism 30 may support the plate element 28 on both sides of the plate element, as shown in FIGS. 5-10, or may support the plate element 28 only on one side (i.e., cantilevered), as shown in FIGS. 11-14. The manipulator mechanism 20 may move the plate element 28 at a rate of movement that maintains the plate element 28 in position for a sufficient time to heat the faying surfaces 34,36 to the melting temperature. The movement rate may be substantially continuous or potentially variable in order to better maintain particular temperatures. The rate of movement may depend on such factors as the operating temperature of the plate element 28 and the rate of heat transfer from the plate element 28 to the faying surfaces 34,36. Further, the manipulator mechanism 30 may move the plate element 28 at a speed that maintains the operating temperature with the available power or may adjust the power to support the desired movement speed in a closed control loop such that the peak temperature (plate temperature) and the adherend surface temperature after the passage of the plate element 28 are both within the appropriate temperature range for obtaining a strong weld without degrading the thermoplastic components 22,24.

The manipulator mechanism 20 may further include a guide roller 62 configured to guide movement of and ensure desired positioning of the plate element 28 between the first and second faying surfaces 34,36. In one implement, the guide roller 62 may roll over a surface of one of the components 22,24. The first and second components 22,24 may be positioned by tooling, or the manipulator mechanism 30 may include a guidance feature to position one of the components relative to the other. In one implementation, the manipulator mechanism 20 may further include a compliance spring, arm, or cylinder or similar compliance element 64 configured to maintain the guide roller 62 in contact with the surface of the component 22,24 as the plate element 28 is moved. Relatedly, the system 20 may further include one or more temporary or permanent fasteners 66a,66b positioned at the extreme ends of the first and second components 22,24 as desired or necessary to maintain the component 22,24 in proper alignment, though permanent fasteners may limit how closely the weld can approach these ends.

In one implementation, the manipulator mechanism 30 may use only localized pressure applied by the manipulator mechanism 30 because the mass of the material being heated is less than with most other welding methods and no foreign material is being introduced. In another implementation, the manipulator mechanism 30 may further include a pressure roller 70 configured to press the melted first and second faying surfaces 34,36 together behind the plate element 28 as the plate element 28 is moved along the interface 58 by the manipulator mechanism 30, thereby facilitating the bonding together of the cooling first and second faying surfaces 34,36. The pressure applied by the pressure roller 70 may depend on the nature of the first and second components 22,24. In particular, stiffer components may require greater pressure. In one implementation, the pressure applied by the pressure roller may be at least 1 bar.

In one implementation, the manipulator mechanism 20 may further include a cooling nozzle 72 configured to deliver a cooling fluid, such as compressed air, refrigerant, or water, may be impinged against the first and second components 22,24 to accelerate cooling as desired or necessary. In one implementation, the manipulator mechanism 20 may further include an inert gas nozzle 74 configured to deliver an inert gas into the weld area in order to displace the oxygen in the weld area and thereby reduce the potential for oxidation and/or fire during the heating and consolidating phases. In one implementation, the system 20 may further include a support surface 76 position beneath, behind, or otherwise adjacent to the second component 24. The support surface 76 may be compressible or otherwise flexible so as to accommodate a deflection of the second component 24 as the plate element 28 moves between first and second faying surfaces 34,36. For example, in the example application in which the first component is a stringer and the second component is a skin, because the skin is much more flexible than the stiffener, the skin may be placed on the support surface 76, and the support surface 76 may compress or otherwise flex to accommodate the deflection of the skin, while also providing a constant reaction force against the plate element 28 and the melted weld line. The support surface 76 may itself rest upon a flat or contoured tool 78.

Figure 17:
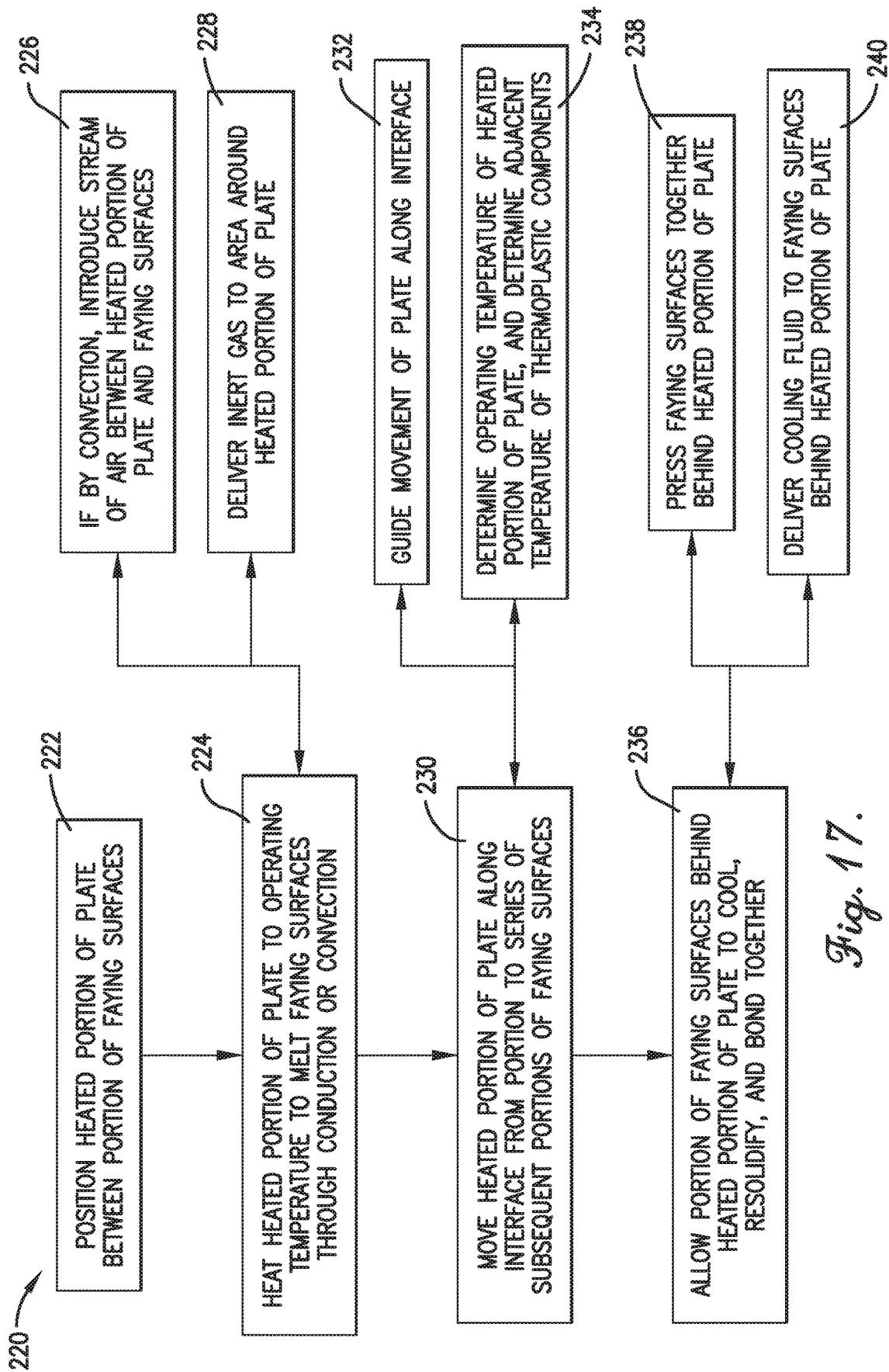
FIG. 17 is a flowchart of steps involved in a method of welding first and second thermoplastic component to create a composite structure, wherein the system is shown in a starting position.

Referring to FIG. 17, the system 20 may function substantially as follows to weld the first thermoplastic component 22 to the second thermoplastic component 24 along the interface 58 to create the composite structure 26. Additional functionality of the system 20 may be reflected in the steps of the method 200 discussed below. Broadly, the heated portion of the plate element 28 may be positioned between the portion 32a of the first faying surface 34 of the first thermoplastic component 22 and the second faying surface 36 of the second thermoplastic component 24, as shown in 222. The heated portion may be heated to the operating temperature which is sufficient to melt the matrix of the first and second faying surfaces 34,36, as shown in 224. The manipulator mechanism 30 may move the heated portion of the plate element 28 along the interface 58 from between the portion 32a of the first and second faying surfaces 34,36 to between the series of subsequent portions 32b-32e of the first and second faying surfaces 34,36, as shown in 230. As the plate element 28 is moved along the interface 58, the portion of the first and second faying surfaces 34,36 behind the plate element 28 is no longer exposed to the operating temperature and so begins to cool and re-solidify and bond together, as shown in 236, which results in the first thermoplastic component 22 being welded to the second thermoplastic component 24 along the interface 58 to create the composite structure 26.

The system 20 may include more, fewer, or alternative components and/or perform more, fewer, or alternative actions, including those discussed elsewhere herein, and particularly those discussed in the following section describing the method 220.

Referring again to FIG. 17, an embodiment of a method 220 is shown for welding a first thermoplastic component 22 to a second thermoplastic component 24 along an interface 58 to create a composite structure 26. The method 220 may be a corollary to the functionality of the system 20 described above, and may be similarly implemented using the various components of the system 20. Broadly, the method 220 may proceed substantially as follows.

A heated portion of a plate element 28 may be positioned between a portion 32a of a first faying surface 34 of the first thermoplastic component 22 and a second faying surface 36 of the second thermoplastic component 24, as shown in 222. The heated portion may be heated to an operating temperature which is sufficient to melt the matrix resin of the portion 32a of the first and second faying surfaces 34,36 without exceeding a decomposition temperature of the first and second components 22,24, as shown in 224. The heated portion may be heated by joule heating or by substantially any other suitable technique, and the resulting heat may be transferred to the portion 32a of the first and second faying surfaces 34,36 by conduction or radiation or convection. In an implementation in which heat is transferred from the plate element 28 to the first and second faying surfaces 34,36 by convection, an air nozzle 80 or similar mechanism may be used to introduce a stream of air or other inert gas between at least the heated portion of the plate element 28 and the first and second faying surfaces 34,36 so as to enhance convection and/or reduce oxidation, as shown in 226. In one implementation, an inert gas nozzle 74 or similar mechanism may be used to deliver an inert gas to displace oxygen around the heated portion of the plate element 28, as shown in 228.

A manipulator mechanism 30 may move the heated portion of the plate element 28 along the interface 58 from between the portion 32a of the first and second faying surfaces 34,36 to between a series of subsequent portions 32b-32e of the first and second faying surfaces 34,36, as shown in 230. As the plate element 28 is moved along the interface 58, the portion of the first and second faying surfaces 34,36 behind the plate element 28 is no longer exposed to the operating temperature and so begins to cool and re-solidify and bond together, as shown in 236, which results in the first thermoplastic component 22 being welded to the second thermoplastic component 24 along the interface 58 to create the composite structure 26. In one implementation, a guide roller 62 or similar mechanism may be used to guide movement of the plate element 28 along the interface 58 between the first and second faying surfaces 34,36, as shown in 232.

A first temperature sensor 40 may be used to determine the operating temperature of the heated portion of the plate element 28, and a second temperature sensor 42 may be used to determine a temperature of the first and second thermoplastic components 22,24, as shown in 234, and this information may be used to control the heating of the heated portion of the plate element 28 and the speed with which the manipulator mechanism 30 moves the heated portion along the interface 58.

In one implementation, a pressure roller 70 or similar mechanism may be used to apply a pressure to press the cooling first and second faying surfaces 34,36 together behind the plate element 28 to enhance bonding as the plate element 28 is moved along the interface 58, as shown in 238. In one implementation, a cooling nozzle 72 or similar mechanism may be used to deliver a cooling gas or other fluid to accelerate cooling of the first and second faying surfaces 34,36 behind the plate element 28 to hasten re-solidification and bonding as the plate element 28 is moved along the interface 58, as shown in 240.

The method 220 may include more, fewer, or alternative actions, including those discussed elsewhere herein.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for welding a first thermoplastic component to a second thermoplastic component along an interface to create a composite structure, the system comprising:
   a plate comprising a heated portion positioned between a portion of a first faying surface of the first thermoplastic component and a second faying surface of the second thermoplastic component, the heated portion being heated to a temperature which is sufficient to melt the portion of the first and second faying surfaces; and
   a manipulator mechanically coupled with the plate and moving the plate along the interface from between the portion of the first and second faying surfaces, which then cool and bond together, to between a series of subsequent portions of the first and second faying surfaces.

2. The system of claim 1, the heated portion the plate comprising a thickness of between 0.01 inches and 0.03 inches.

3. The system of claim 1, the heated portion of the plate being heated using joule heating.

4. The system of claim 1, further comprising a first temperature sensor determining the operating temperature of the plate, and a second temperature sensor determining an adjacent temperature of the first and second thermoplastic components.

5. The system of claim 1, at least the heated portion of the plate being in physical contact with the first and second faying surfaces, and melting the first and second faying surfaces through conduction.

6. The system of claim 5, a front portion of the plate comprising a rake angle to control any excess melted thermoplastic material from the first and second faying surfaces.

7. The system of claim 6, the rake angle being between 10 degrees and 50 degrees.

8. The system of claim 1, at least the heated portion of the plate being suspended between and not in physical contact with the first and second faying surfaces, and melting the first and second faying surfaces through radiation and convection.

9. The system of claim 8, further comprising a spacer creating a gap between the first and second faying surfaces, and at least the heated portion of the plate being located in the gap.

10. The system of claim 9, the spacer being an unheated front portion of the plate.

11. The system of claim 9, the spacer comprising one or more circular rollers.

12. The system of claim 8, further comprising an air nozzle introducing a stream of air between at least the heated portion of the plate and the first and second faying surfaces so as to enhance convection.

13. The system of claim 8, further comprising one or more holes in the plate to enhance convection.

14. The system of claim 1, the manipulator further comprising a guide roller guiding movement of the plate along the interface between the first and second faying surfaces.

15. The system of claim 1, the manipulator further comprising a pressure roller pressing the first and second faying surfaces together behind the plate as the plate is moved along the interface.

16. The system of claim 1, the manipulator further comprising a cooling nozzle delivering a cooling fluid to accelerate cooling of the first and second faying surfaces behind the plate as the plate is moved along the interface.

17. The system of claim 1, the manipulator further comprising an inert gas nozzle delivering an inert gas to displace oxygen around the heated portion of the plate.

18. The system of claim 1, further comprising a support surface positioned behind the second thermoplastic component, the support surface being flexible so as to accommodate a deflection of the second thermoplastic component as the plate is moved between the first and second faying surfaces.

19. A method for welding a first thermoplastic component to a second thermoplastic component along an interface to create a composite structure, the method comprising:

positioning a plate between a portion of a first faying surface of the first thermoplastic component and a second faying surface of the second thermoplastic component;

heating at least a portion of the plate to a temperature which is sufficient to melt the portion of the first and second faying surfaces; and moving the plate with a manipulator mechanically coupled with the plate along the interface from between the portion of the first and second faying surfaces, which then cool and bond together, to between a series of subsequent portions of the first and second faying surfaces.

20. A method for welding a first thermoplastic component to a second thermoplastic component, the method comprising:

positioning a plate between a portion of a first surface of the first thermoplastic component and a second surface of the second thermoplastic component;

heating at least a portion of the plate to a temperature which is sufficient to melt the portion of the first and second surfaces; and moving the plate from between the portion of the first and second surfaces, which then cool and bond together, to between a series of subsequent portions of the first and second surfaces.

* * * * *